(12) United States Patent
Ciciriello et al.

(10) Patent No.: US 10,927,891 B2
(45) Date of Patent: Feb. 23, 2021

(54) BEARING ARRANGEMENT

(71) Applicant: ROLLS-ROYCE plc, London (GB)

(72) Inventors: Lucia Ciciriello, Berlin (DE); Colin J. Parrish, Derby (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 15/957,084

(22) Filed: Apr. 19, 2018

(65) Prior Publication Data
US 2018/0306241 A1 Oct. 25, 2018

(30) Foreign Application Priority Data

Apr. 19, 2017 (GB) .................................. 1706179.7

(51) Int. Cl.
 *F16C 27/04* (2006.01)
 *F01D 25/16* (2006.01)
 (Continued)

(52) U.S. Cl.
 CPC ............ *F16C 27/04* (2013.01); *F01D 25/164* (2013.01); *F16C 19/527* (2013.01);
 (Continued)

(58) Field of Classification Search
 CPC ........ F16C 19/527; F16C 27/00; F16C 27/04; F16C 27/045; F16C 27/066; F16C 33/586; F16C 35/073; F16C 35/077; F16C 2233/00; F16C 2360/23; F01D 25/164; F01D 19/26
 See application file for complete search history.

(56) References Cited

U.S. PATENT DOCUMENTS 1,386,255 A * 8/1921 Hindle ................... F16C 27/04
 29/898.063
2,556,317 A * 6/1951 Cook ....................... B04B 9/12
 384/535
(Continued)

FOREIGN PATENT DOCUMENTS

DE 3728039 3/1989
DE 102015221409 2/2017
(Continued)

OTHER PUBLICATIONS

Machine Translation of DE 102015221409 (Year: 2015).*
(Continued)

*Primary Examiner* — Alan B Waits
(74) *Attorney, Agent, or Firm* — Simpson & Simpson PLLC

(57) ABSTRACT

A bearing arrangement (30) comprises an inner support annulus (33), an outer support annulus (31), and a plurality of rollers (34) therebetween. At least one of the inner and the outer support annulus (33, 31) comprises one or more radially extending rigid supports (37) and one or more damping sectors (38a, 38b, 38c). The one or more rigid supports (37) are circumferentially interposed between one or more damping sectors (38a, 38b, 38c). Each damping sector (38a, 38b, 38c) comprises at least one damping member (39) comprising an elongate flexible member held rigidly at one or both ends thereof, such that vibrational movement of the inner or outer support annulus (33, 31) causes bending of the elongate flexible members (39).

10 Claims, 5 Drawing Sheets

(51) Int. Cl.
*F16C 19/52* (2006.01)
*F16C 35/077* (2006.01)
*F16C 27/06* (2006.01)
*F16C 35/073* (2006.01)
*F16F 15/12* (2006.01)
*F16C 19/26* (2006.01)

(52) U.S. Cl.
CPC .......... *F16C 27/066* (2013.01); *F16C 35/073* (2013.01); *F16C 35/077* (2013.01); *F16F 15/1208* (2013.01); *F16C 19/26* (2013.01); *F16C 2360/23* (2013.01)

(56) References Cited

U.S. PATENT DOCUMENTS

| | | | | |
|---|---|---|---|---|
| 2,602,009 | A * | 7/1952 | Barlow | F16C 27/045 384/215 |
| 2,936,141 | A * | 5/1960 | Rapata | F16C 27/02 248/604 |
| 3,318,642 | A * | 5/1967 | Peterson | F16C 27/02 384/215 |
| 3,554,619 | A * | 1/1971 | Irwin | F16C 27/04 384/536 |
| 3,743,365 | A | 7/1973 | Kato | |
| 4,378,197 | A * | 3/1983 | Cattaneo | F01D 25/18 184/6.11 |
| 4,655,614 | A * | 4/1987 | Schott | F16C 27/04 267/150 |
| 4,872,767 | A * | 10/1989 | Knapp | F01D 25/164 384/99 |
| 5,033,875 | A * | 7/1991 | Moulinet | B60K 17/24 384/536 |
| 5,286,117 | A | 2/1994 | Wojan et al. | |
| 5,421,655 | A * | 6/1995 | Ide | F01D 25/164 384/99 |
| 5,437,599 | A * | 8/1995 | Feldkamp | B04B 9/12 210/380.3 |
| 5,501,531 | A * | 3/1996 | Hamaekers | B60K 17/24 384/536 |
| 5,612,583 | A * | 3/1997 | Crucq | H02K 5/1732 310/273 |
| 6,224,533 | B1 * | 5/2001 | Bengtsson | B04B 9/12 384/535 |
| 7,452,135 | B1 * | 11/2008 | Holsaple | F16C 27/04 267/201 |
| 7,553,123 | B2 * | 6/2009 | Casaro | F01D 25/164 415/90 |
| 8,777,793 | B2 * | 7/2014 | Sheridan | F16C 23/045 475/160 |
| 2008/0152483 | A1 | 6/2008 | Godleski | |
| 2011/0058759 | A1 * | 3/2011 | Herborth | F01D 25/164 384/55 |
| 2015/0369080 | A1 | 12/2015 | Arghir et al. | |
| 2016/0091020 | A1 * | 3/2016 | Siebke | F16C 39/02 384/535 |

FOREIGN PATENT DOCUMENTS

| | | |
|---|---|---|
| EP | 0884108 | 12/1998 |
| EP | 2518279 | 10/2012 |
| JP | 2009287679 A * | 12/2009 |
| WO | 2014000797 | 1/2014 |

OTHER PUBLICATIONS

Machine Translation for JP 2009287679 A (Year: 2009).*
European search report dated Jun. 4, 2018, issued in EP Patent Application No. 18162840.
Great Britain Search Report dated Oct. 5, 2017, issued in GB Patent Application No. 1706179.7.

* cited by examiner

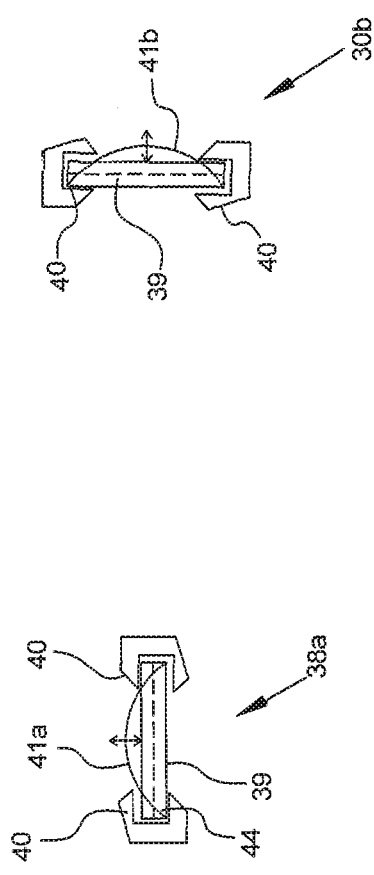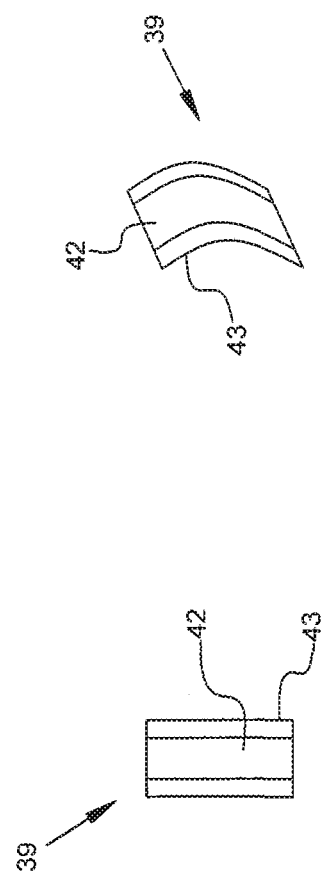

BEARING ARRANGEMENT

CROSS-REFERENCE TO RELATED APPLICATION

This application is based upon and claims the benefit of priority from British Patent Application Number 1706179.7 filed Apr. 19, 2017, the entire contents of which are incorporated by reference.

BACKGROUND

Field

The present disclosure concerns a roller bearing arrangement, particularly but not exclusively, a rolling element bearing arrangement for a gas turbine engine.

Description of Related Art

Rolling element bearings are used in a large number of applications for providing support to relative rotational movement between components (such as shafts within a gas turbine engine). Rolling element bearings typically comprise annular inner and outer races, with a plurality of rollers (such as spherical or cylindrical rollers) therebetween to provide support. The rollers are supported by a cage within which the rollers rotate.

In many cases, it is desirable to damp vibration from one or multiple shafts, to prevent this vibration being transmitted through the bearing to the other shafts and to the housings and engine static structures. In one example, where the bearing is used to provide support for a gearbox coupling a turbine shaft with a fan shaft in a gas turbine engine, vibration may also cause tooth misalignment within the gearbox, which would lead to excessive wear, fatigue life limitation and cabin noise increase.

Previously, bearings comprising squeeze film dampers have been utilised, in which oil flow between bearing components is utilised to damp vibration. However, such existing damping mechanisms do not provide sufficient structural resistance to meet the challenging requirements of some bearing applications, such as in power transmission gearboxes.

SUMMARY

According to a first aspect there is provided a bearing arrangement comprising: an inner support annulus, an outer support annulus, and a plurality of rollers therebetween, at least one of the inner and the outer support annulus comprising one or more radially extending rigid supports, and one or more damping sectors, the one or more rigid supports being circumferentially interposed between one or more damping sectors; each damping sector comprising at least one damping member, each damping member comprising an elongate flexible member held rigidly at one or both ends thereof, such that vibrational movement of the inner or outer support annulus causes bending of the elongate flexible members.

Advantageously, the bending of the elongate flexible members absorbs and dissipates the vibrational energy, and so damps vibration prior to it being transmitted through the rolling elements and the other race.

The one or more rigid supports may be circumferentially interposed between one or more damping sectors.

Each damping sector may comprise a plurality of spaced damping members. One or more damping members may have a different length to the remaining damping members. Advantageously, the damping van be "tuned", with different length damping members being responsive to different frequency vibrations. Consequently, the reduction of the vibration level related to particular frequencies or a broad range of vibrational frequencies can be targeted.

The damping sectors may be unevenly spaced. Advantageously, this may detune nodal diameter modes disrupting the symmetry introduced by the rolling elements.

One or more damping member may extend in a generally circumferential direction. Advantageously, radial vibration modes may be damped.

Alternatively or in addition, one or more damping member may extend in a generally radial direction. Advantageously, circumferential vibration modes may be damped.

Alternatively or in addition, one or more damping member may extend in a generally axial direction. Advantageously, axial and/or bending vibration modes may be damped.

Damping sectors having radially extending damping members may be interposed by damping sectors having circumferentially extending damping members.

Each damping member may comprise an elongate shim comprising a core having a first spring constant, and a damping coating applied on one or both sides of the core comprising a second spring constant different to the first spring constant. Advantageously, shear interaction between the core and the coating may dissipate energy where the damping member is caused to flex.

The shim may comprise steel or compatible steel alloy, and the coating may comprise molybdenum disulphide or a ceramic material such as titanium-alumina.

The number of rigid supports and/or damping sectors may be neither equal to nor a multiple of the number of rollers. Advantageously, this reduces harmonics generated by the rollers passing the damping sectors.

According to a second aspect of the disclosure, there is provided a gas turbine engine comprising the bearing arrangement of the first aspect.

The gas turbine engine may comprise a turbine coupled to a fan via a reduction gearbox. The reduction gearbox may comprise an epicyclic gearbox comprising a sun gear coupled to an input shaft, a plurality of planet gears, a planet carrier and a ring gear. The fan may be coupled to the epicyclic gearbox via an output shaft. The output shaft may be coupled to one of the planet carrier and the ring gear. The bearing arrangement may be arranged to support one or more of the input shaft, the output shaft and the planet gears of the epicyclic gearbox.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE DRAWINGS

Embodiments will now be described by way of example only, with reference to the Figures, in which:

FIGS. 4a and 4b are sectional front views of part of the bearing assembly of FIG. 3;

FIGS. 5a and 5b are sectional front views of damping members of the bearing assembly of FIG. 3;

DETAILED DESCRIPTION

Figure 1:
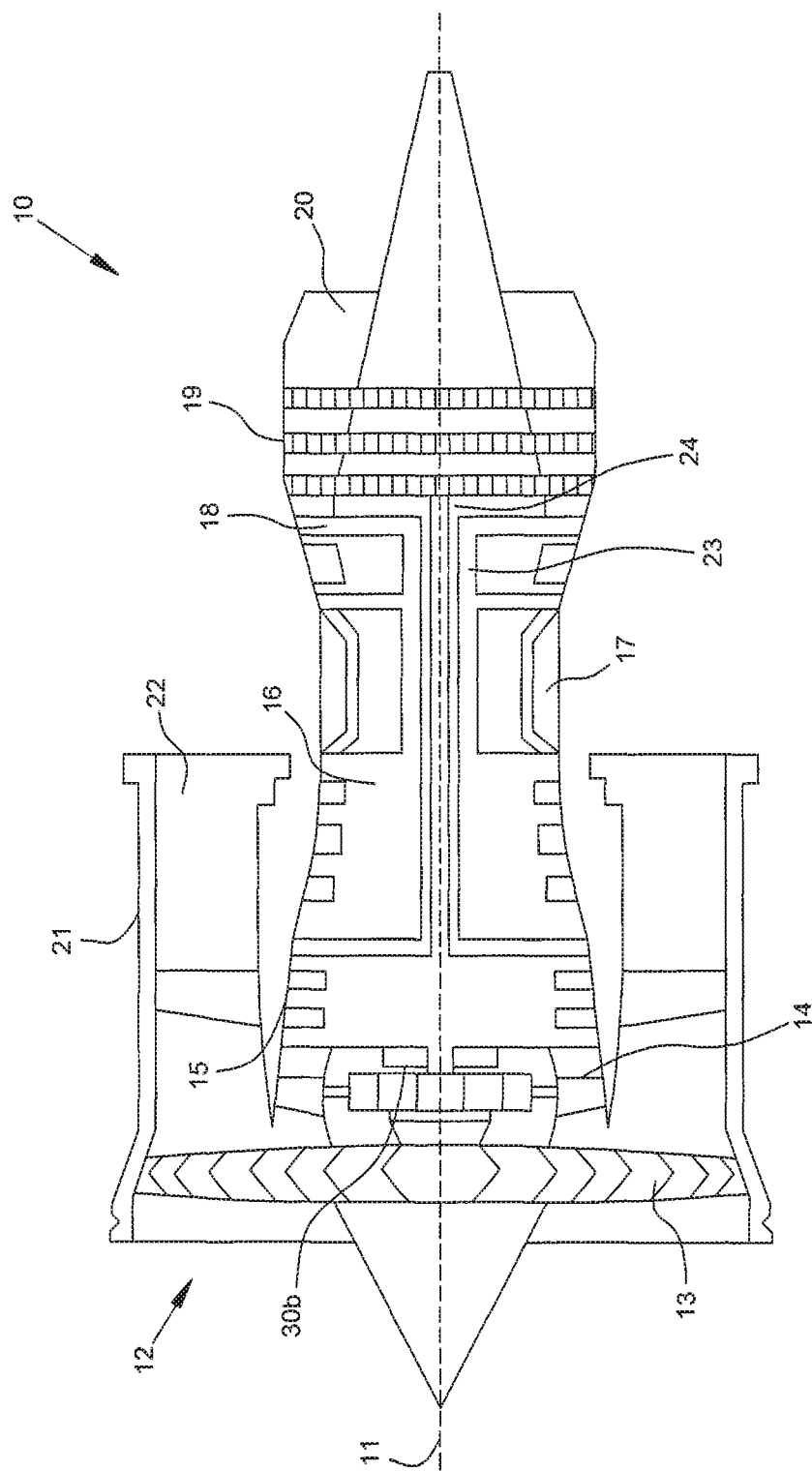
FIG. 1 is a schematic sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, a gearbox 14, an intermediate pressure compressor 15, a high-pressure compressor 16, combustion equipment 17, a high-pressure turbine 18, a low-pressure turbine 19 and an exhaust nozzle 20. A nacelle 21 generally surrounds the engine 10 and defines the intake 12.

The gas turbine engine 10 works in the conventional manner so that air entering the intake 12 is accelerated by the fan 13 to produce two air flows: a first air flow into the intermediate pressure compressor 15 and a second air flow which passes through a bypass duct 22 to provide propulsive thrust. The intermediate pressure compressor 15 compresses the air flow directed into it before delivering that air to the high pressure compressor 16 where further compression takes place.

The compressed air exhausted from the high-pressure compressor 16 is directed into the combustion equipment 17 where it is mixed with fuel and the mixture combusted. The resultant hot combustion products then expand through, and thereby drive the high 18 and low-pressure 19 turbines before being exhausted through the nozzle 20 to provide additional propulsive thrust. The high 18 and low 19 pressure turbines drive respectively the high pressure compressor 16 and intermediate pressure compressor 15, respective high pressure 23 and low pressure 24 turbine shafts. The low pressure turbine 19 also drives the fan 13 via the gearbox 14.

Figure 2:
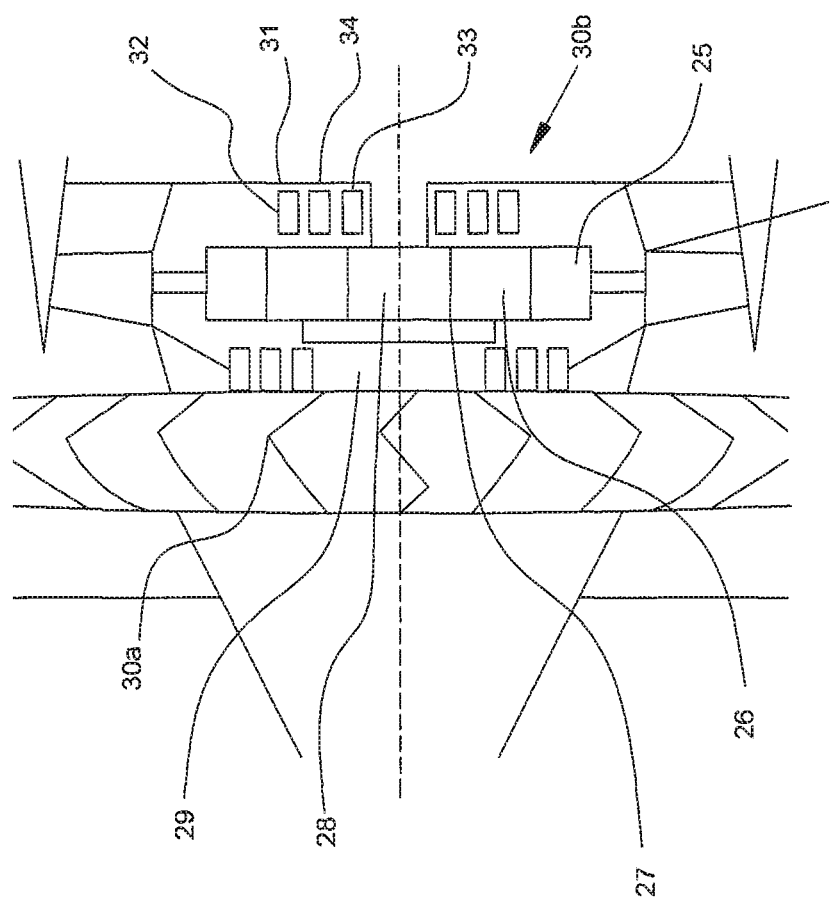
FIG. 2 is a schematic sectional side view of part of the gas turbine engine of FIG. 1.

The gearbox 14 is shown in further detail in FIG. 2. The gearbox 14 is a reduction gearbox in that it gears down the rate of rotation of the fan 13 by comparison with the intermediate pressure compressor 15 and low pressure turbine 19. The gearbox 14 is an epicyclic planetary gearbox having a static ring gear 25; rotating and orbiting planet gears 26 supported by a planet carrier 27 and a rotating sun gear 28. Accordingly, an input shaft in the form of the low pressure turbine shaft 24 drives an output shaft in the form of a fan shaft 29 via the gearbox. It will be understood that different epicyclic gearbox arrangements may be utilised. For example, the planet carrier may be held static, and the ring gear may be coupled to the fan.

Bearing arrangements 30a, 30b are provided, which are arranged to rotatably support the input shaft 24 and output shaft 29 respectively. Each bearing arrangement 30a, 30b comprises a static annular outer annulus in the form of a bearing race 31 which is supported relative to a further static component by a support arm 32. Each bearing arrangement 30a, 30b further comprises an inner annulus in the form of an inner race 33, which is coupled to the respective shaft 24, 29 and rotates therewith. Between the inner and outer races 31, 33 is a plurality of rollers in the form of either spherical or cylindrical bearings 34 which are mounted within a cage 35. The bearings 34, inner race 33, cage 35 and shaft 24, 29 rotate about a common axis 36, while the outer race 31 remains static.

Figure 3:
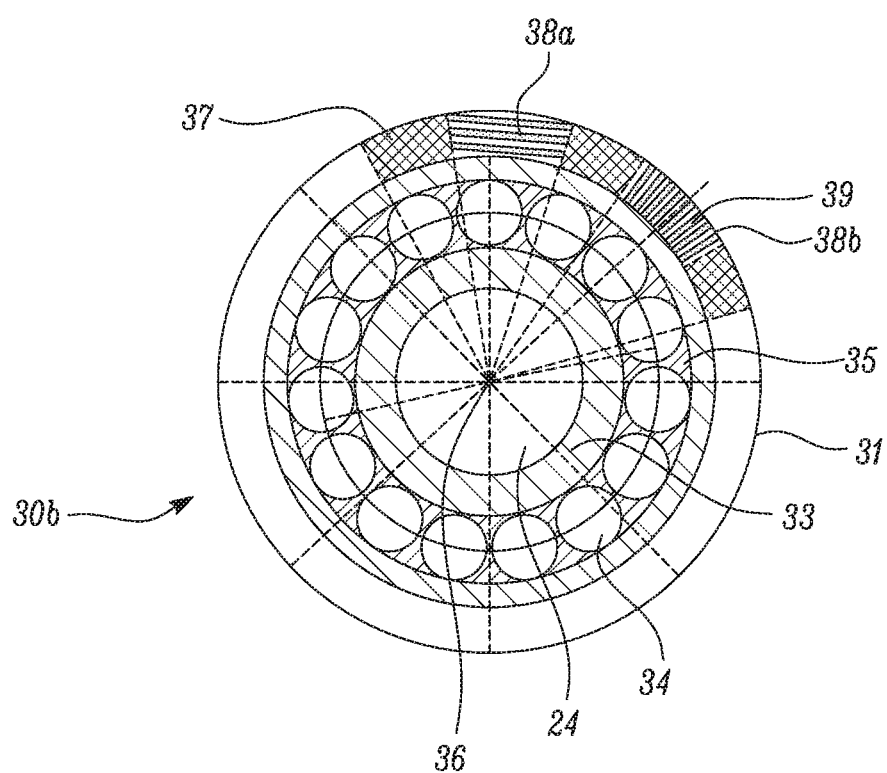
FIG. 3 is a schematic sectional front view of a bearing assembly in accordance with the present disclosure.

A front view of one of the bearing arrangements 30a is shown in further detail in FIG. 3.

As can be seen, the outer race 31 comprises a plurality of radially extending, rigid supports in the form of spokes 37, only a subset of which are shown for clarity. Each support segment 37 is in the form of an arc, and extends part circumferentially around the circumference of the outer race 31. Each support segment 37 provides structural rigidity and supports both axial and radial loads imposed on the bearing arrangement 30a, either from the shaft 24 or from the support arm 32. In order to absorb these loads without flexing, the rigid segments are formed from a relatively stiff material (such as steel), and are substantially solid. A plurality of spokes 37 are provided, circumferentially spaced around the circumference of the outer race 31, and thereby form the spokes of a wheel. Consequently, a stiff, lightweight structure is provided, which provides stiffness in all degrees of freedom. Consequently, the shaft axis is maintained at the point 36 in operation.

The outer race 31 further comprises a plurality of circumferentially spaced damping segments 38a, 38b, which are distributed about the circumference of the outer race 31, and are interposed between the spokes 37. Each damping segment 38a, 38b comprises a plurality of spaced elongate damping members 39. The damping members 39 of the damping segment 38a have a long axis which extends in a generally circumferential or tangential orientation and are radially spaced, whilst the damping members 39 of the damping segment 38b have a long axis which extends in a generally radial direction, normal to the shaft axis 36, and are circumferentially spaced.

Generally, the number of damping segments 38a, 38b and spokes 37 is different (and is not an integer multiple of) the number of rolling elements 34. In this embodiment, fifteen bearings 34 are provided, and nine spokes 37. This ensures that there is no modal symmetry, and so harmonics are not produced by the bearings passing the spokes 37 and damping segments 38a, 38b in a regular pattern in use. Similarly, the circumferential width of the spokes 37 and damper segments 38a, 38b may be varied to avoid harmonics from developing.

The damping members are shown in further detail in FIGS. 4 and 5. Referring to FIG. 4a, a damping member 39 of damping segment 38a is shown. The damping member 39 is in the form of a bar, with one or both of its opposing ends being constrained within a mounting arrangement. The mounting arrangement comprises circumferentially extending, radially spaced arms 40 which are formed from circumferential ends of adjacent spokes 37. The arms 40 form a slot therebetween, to trap ends of the damping member 39 therebetween, thereby constraining radial movement of one or both of the ends. However, a slight radial gap may be provided, to allow both ends to pivot between the arms 40 (i.e. "free-free" support of the ends). Alternatively, the ends of the member 39 may be in contact with the arms 40 (i.e. "pin-pin" support). In either case, a mid-section of the damping member 39 is free to bend back and forth in a radial direction, as shown by notional line 41a.

Similarly, in FIG. 4b, a damping member 39 of damping segment 38b is shown. In this case, the damping member 39 has its long axis extending radially. Again, a slot formed by opposing arms 40 is defined at each end, thereby constraining circumferential movement of the ends, whilst permitting circumferential bending of a mid-section of the damping member 39, as shown by notional line 41b.

Figure 7:
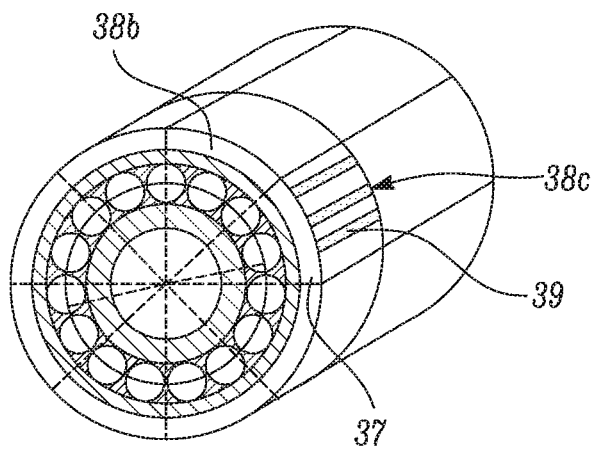
FIG. 7 is a perspective side view of the bearing assembly of FIG. 3.

Referring to FIG. 7, further damping segments 38c may be provided. The further damping segments 38c comprise damping members 39 having a long axis which extends parallel to the common axis 36. Again, ends of the damping members 39 are constrained relative to the spokes 37, such that vibration transmitted through the spokes is damped by the damping members 39. In this case, the damping members 39 of the segment 38c damp bending and/or axial vibrations of the shaft 24.

A damping member 39 is shown in more detail in an un-bent position in FIG. 5a, and in a bent position (as represented by notional line 41b) in FIG. 5b. The damping member 39 comprises a core 42 formed of a flexible metallic material such as steel. In view of the dimensions and material of the core 42, the core is able to flex to a high degree without fatigue failure. A coating 43 is applied to an outer surface of the core 42, such that the core 42 and coating 43 are bonded together. In this embodiment, the coating is in the form of molybdenum sulphide, though other suitable coatings may be provided, such as ceramics. The coating and the core material have different Young's modulus (i.e. spring constants). Consequently, when the shim undergoes a vibratory pattern, the coating will vibrate with a known phase lag with respect to the plate vibration. This phase lag is what damps the vibration, and so the core and coating act as structural damping. Structural damping can be distinguished from viscous damping since, in structural damping, the damping effect is proportional to displacement instead of velocity, as in the viscous damping.

The damping member 39 may be held in tension in a direction parallel to the long axis of the damping member 39 within the arms 40, for instance by springs 44. The tension provided by the springs or other tensioning means can also be used to "tune" the damping members, to have a peak damping response at a desired frequency.

As can be seen from a comparison between FIGS. 5a and 5b, bending of the damping member 39 causes shear between the core 42 and coating 43. Consequently, heat is generated, which dissipates energy, and so the damping member 39 serves to dissipate vibrational energy.

Figure 6A:
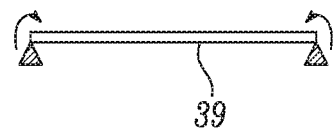
FIGS. 6a to 6c are sectional front views of alternative mounting means for the damping members of FIGS. 5a and 5b.
Figure 6B:
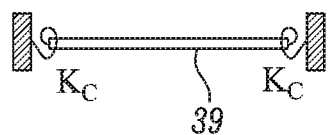
Figure 6C:
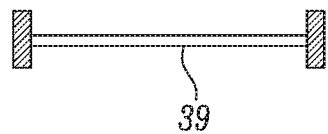

It will be understood that each damping member 39 can be modelled as a simple damped beam, oscillating with one or two degrees of freedom, depending how the ends of the member 39 are held by the arms 40. The damping will peak at the natural frequency $\lambda_n$ $$f_n = \frac{1}{2\pi}\sqrt{\frac{K_n}{M_n}}$$

of the respective member 39, which will depend on the mass of the member 39, its dimensions, its spring constant K* and its constraint condition, as shown in further detail in FIGS. 6a to 6c.

FIG. 6a shows a damping member 39 constrained in accordance with a first constraint condition. In the first constraint condition, the ends are supported on one side by respective supports, and are allowed to pivot relative to the supports. This is known as "free-free" support.

In a second constraint condition (shown in FIG. 6b), the ends of the damping member 39 are held in tension in a direction along the long axis of the damping member 39, with a separate spring having a different (generally lower) spring constant than the main body of the damping member 39.

In a third constraint condition (shown in FIG. 6c), the end of the damping member 39 are fixed, such that only the middle section can bend (so called "pin2pin" support).

It will be understood that the damping members can be supported in accordance with one or more of these methods, and that the vibrational response of the damping member will vary accordingly.

As will be understood, the spring constant K* of the beam depend on the core material spring constant $K_1$, and the coating spring constant $K_2$ as follows:

$$K^* = K_1 + K_2(1+i\eta_2)$$

Where $\eta$ is the damping coefficient, and so $i\eta_2$ is the complex stiffness due to the structural damping coating. Consequently, the length, thickness, material parameters and/or other parameters can be varied to adjust the natural frequency and damping efficiency of the damping members 39 in order to maximise the reduction in amplitude of the vibration transmitted by the spokes, and so adjust the vibrational frequency at which peak vibration damping occurs.

In some cases, the natural frequency of individual damping members 39 may be adjusted, such that damping over a broad range of frequencies is provided. Similarly, the natural frequency of the damping members of damping segment 38a may be different to those of segment 38b, to reflect the different vibrational frequencies of tangential and radial vibrational components.

In use, both the shaft 24 and the static components to which the bearings 30a, 30b are mounted are subject to vibration due to for instance, fan imbalance, engine thrust changes, and air turbulence in flight. This can cause tooth misalignment between the sun, planet and ring gears, which can in turn lead to excessive wear and premature component failure.

These vibrations can be damped by the bearing arrangement 30a, 30b as follows. Where the vibration originates from the low pressure turbine shaft 24 for example, these vibrations are transmitted through to the bearing inner race 33, and then into the bearings 34, and then into the outer race 31. These vibrations cause the damping members 39 within the damping segments 38a, 38b to oscillate by bending as shown in FIGS. 4a, 4b, 5a and 5b, particularly where the vibrations are at or close to the natural frequency of the members 39, or a multiple thereof. These oscillations are damped by shear interaction between the coating 43 and core 42, which turns vibrational energy to heat, thereby damping the vibrations. Radial vibration components are damped by the circumferential extending members 39 of the segment 38a, while tangential vibration components are damped by the radially extending members 39 of the segment 38b. Meanwhile, axial and radial loads are carried by the relatively rigid, high strength spokes 37.

Accordingly, a bearing arrangement is provided that can effectively damp large vibrational frequency spectra. If desired, the arrangement can be tuned to damp specific vibrational frequencies. Compared to film dampers or journal bearings, the damping arrangement of the present disclosure also has the advantage in that oil feed pipes may not be required, thereby simplifying the arrangement.

Where utilised in conjunction with a reduction gearbox in a gas turbine engine, the arrangement ensures that tooth alignment is maintained in spite of vibration, thereby reducing tooth wear. The system may also significantly decrease overall engine vibration, thereby increasing passenger comfort.

It will be understood that the disclosed bearing arrangement is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

For example, the bearing arrangement could be applied to other rotating systems, such as internal combustion engine shafts, turbomachinery for power generation, wind power plants, marine engines, turbopumps, compressors, rotational electrical equipment and in other machines where a broad band of vibration damping is a requirement.

Optionally, a cooling system may be provided for removing heat generated by the damping arrangement in use. For example, oil may be provided to the outer race, to remove heat. Alternatively, air or conductive cooling may be sufficient.

Optionally, in addition to the damping segments, one or more further full circumference damping members may be provided. The full circumference damping members may be in the form of one or more spaced full annulus rings extending around the full circumference of the inner or outer race, at an axially front or rear end thereof, which are each joined to either the inner or outer race. The rings may behave in a similar manner to the damping members 39, thereby providing additional damping at low vibrational frequencies, due to their relative long length, and so low natural frequency.

The disclosed damping arrangement could be applied to the inner race in a similar manner as that described above, with rigid spokes being provided between damping segments. In general, the outer race is though preferred in view of the larger circumference provided. The damping segments could be integral to or joined to the outer or inner race, or provided as a further annulus in contact with the respective race.

Other gas turbine engines to which the present disclosure may be applied may have alternative configurations. By way of example such engines may have an alternative number of interconnecting shafts (e.g. two) and/or an alternative number of compressors and/or turbines.

The invention claimed is:

1. A bearing arrangement comprising:
an inner support annulus, and outer support annulus, and a plurality of rollers therebetween, at least one of the inner and the outer support annulus comprising one or more radially extending rigid supports, and one or more damping sectors, the one or more rigid supports being circumferentially interposed between one or more damping sectors;
each damping sector comprising a plurality of spaced elongate damping members, each damping member of at least a first damping sector of the one or more damping sectors comprising an elongate flexible member held rigidly at one or both ends thereof and having a long axis extending only in a radial direction between the two ends, such that vibrational movement of the inner support annulus or the outer support annulus causes bending of the elongate flexible members, and wherein the rigid supports are rigid relative to the elongate flexible members.

2. A bearing arrangement according to claim 1, wherein at least one of the one or more damping sectors are unevenly spaced relative to others of the one or more damping sectors.

3. A bearing arrangement according to claim 1, wherein each damping member of at least a second damping sector of the one or more damping sectors has a long axis extending in an axial direction.

4. A bearing arrangement according to claim 1, wherein each damping member comprises an elongate shim comprising a core having a first spring constant, and a damping coating applied on one or both sides of the core comprising a second spring constant different from the first spring constant.

5. A bearing arrangement according to claim 4, wherein the shim comprises steel.

6. A bearing arrangement according to claim 4, wherein the coating comprises molybdenum disulfide a ceramic material, or titanium-alumina.

7. A bearing arrangement according to claim 1, wherein the number of rigid supports and/or damping sectors is neither equal to nor a multiple of the number of rollers.

8. A gas turbine engine comprising a bearing arrangement according to claim 1.

9. A gas turbine engine according to claim 8, wherein the gas turbine engine comprises a turbine coupled to a fan via a reduction gearbox.

10. A gas turbine engine according to claim 9, wherein the reduction gearbox comprises an epicyclic gearbox comprising a sun gear coupled to an input shaft, a plurality of planet gears, a planet carrier and a ring gear.

* * * * *